July 16, 1963 — I. STREIMER — 3,097,639

RESPIROMETERS

Filed March 28, 1961

INVENTOR.
IRVING STREIMER
BY
Reynolds & Christensen
ATTORNEYS

United States Patent Office 3,097,639
Patented July 16, 1963

3,097,639
RESPIROMETERS
Irving Streimer, Bellevue, Wash., assignor to Boeing Airplane Company, Seattle, Wash., a corporation of Delaware
Filed Mar. 28, 1961, Ser. No. 98,851
7 Claims. (Cl. 128—2.08)

This invention relates to improvements in respirometer devices and more particularly in those of the type worn on the person as a chest harness for monitoring respiration by measuring chest expansion and contraction. The invention is herein illustratively described by reference to the presently preferred embodiment thereof; however, it will be recognized that certain modifications and changes therein with respect to details may be made without departing from the underlying essentials involved.

Rheostat respirometers of the chest strap type have been used heretofore. Usually they employed an elastic tube stretched around the chest and filled with an electrically conductive resistance liquid such as mercury or copper sulfate. However, it was found that the resistance value in such devices varied over a period of time and with changes of temperature and pressure. These limitations were particularly serious when conducting physiological tests under actual or simulated flight conditions such as in altitude and pressure chambers. Further, the resistance change for normal chest excursions was relatively small, presenting problems of amplification, and measuring circuit nonlinearity and calibration. Air bubbles trapped in the ends made difficult the establishing of good electrical connections, and reaction between liquid and tubing materials presented still other problems.

Another prior type of respirometer was the strain gauge type, wherein the changes in strain of a chest band with respiration were detected. These devices were subject to the usual strain gauge problems, including in this case: errors due to unbalance in the lead wires or changes in gauge resistance with temperature, the requirement of somewhat elaborate amplifier and demodulation equipment, and mechanical failures due to the relatively high degree of flexure required in order to obtain a reasonable output range, and others.

A broad object of this invention is to provide a harness type, compact, accurate, rugged, and reliable respirometer which overcomes the aforementioned difficulties and shortcomings encountered with prior devices such as those alluded to above.

A specific object hereof is to provide such a respirometer preferably having a linear response characteristic.

A further object is to provide such a device suitable for delivering a high output signal adequate to operate conventional recorders or other indicators without amplification. Stability, long operating life, insensitivity to the effects of temperature and pressure comprise still other objectives.

In accordance with this invention as herein disclosed the respirometer chest band is formed by an elongated inelastic portion and an elastic connecting portion, with the expansion and contraction of the latter being sensed by potentiometer means including resistance and wiper elements mounted on one end of the inelastic portion and relatively movable by means of an inelastic link connecting one of them to the other end of the inelastic portion. In the preferred embodiment the wiper motion is rotary and is effected by means of a spring-returned sheave or drum enwrapped by a chain link which spans the length of the elastic portion. Thus chest expansion and contraction is linearly converted into rotary motion. By appropriate choice of sheave diameter any desired degree of wiper rotation may be effected from a given amount of chest expansion and contraction, thereby to achieve maximum excursion in the magnitude of the electrical signal derived from the potentiometer in the output circuit. Moreover, since the output circuit in which the potentiometer is connected measures not changes of resistance as such but variations in the resistance ratio of the potentiometer resistance portions (i.e., voltage division), stability and accuracy not attainable in a rheostat device are readily attainable. The potentially high output results from availability or utilization of all or most of the potentiometer range.

These and other features, objects and advantages of the invention will become more fully evident from the following description based on the accompanying drawings.

Figure 1:
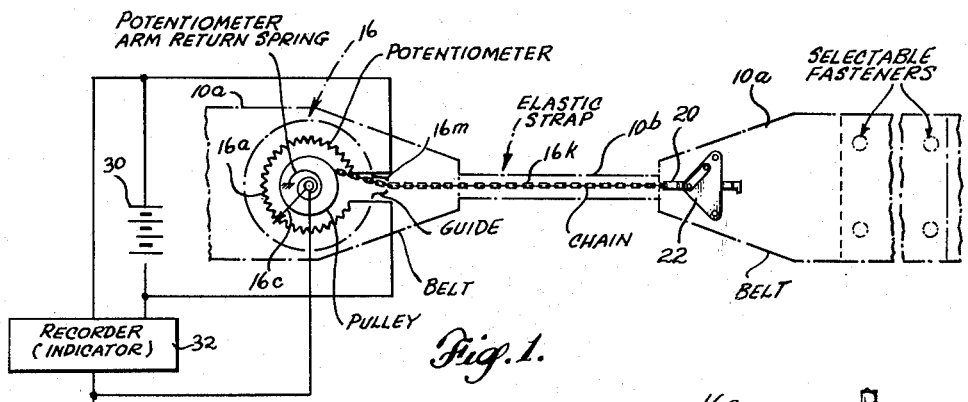
FIGURE 1 is a schematic diagram of the potentiometer, means and output circuit, in relation to the chest band portions.
Figure 2:
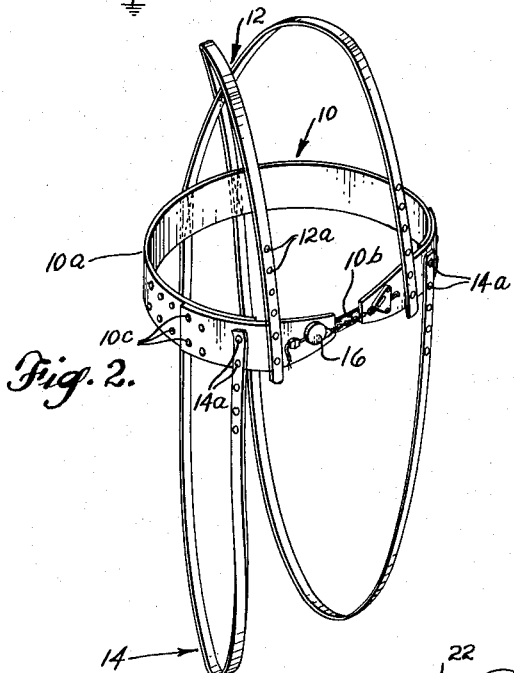
FIGURE 2 is a perspective view of a complete respirometer.
Figure 3:
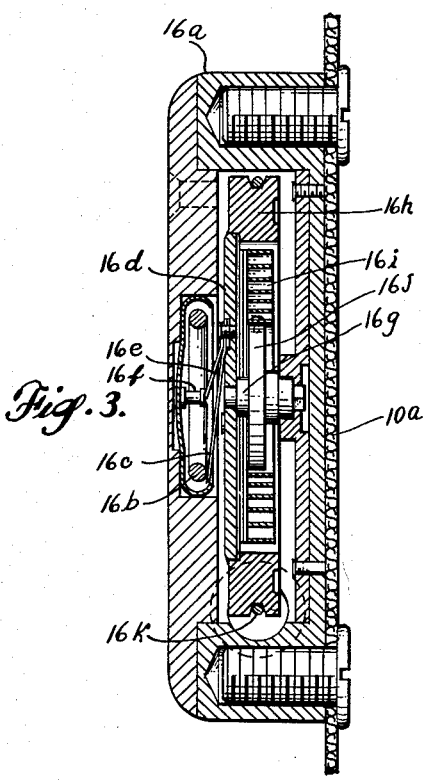
FIGURE 3 is an enlarged longitudinal sectional view of the potentiometer.
Figure 4:
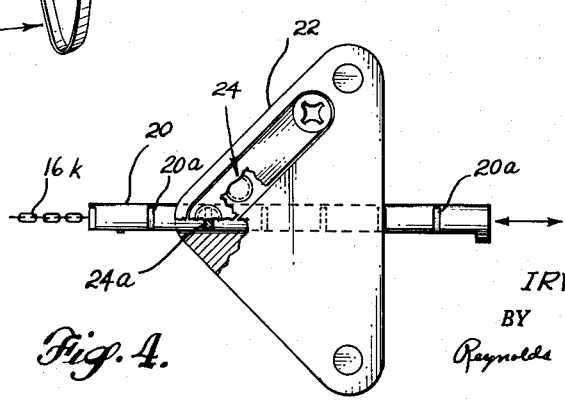
FIGURE 4 is an enlarged front view of an adjustable coupling device.

The harness chest band 10 is maintained at the correct relative height on the patient by shoulder straps 12 and leg straps 14 having suitable band connectors 12a and 14a in order to adjust their length as required. Likewise the chest band 10, which comprises an elongated inelastic portion 10a and a relatively short elastic portion 10b interconnecting the ends of the former, has suitable means such as the spaced connectors 10c for adjusting its length. The band's length is initially set so that the elastic portion 10b is under only slight tension with the chest fully contracted.

Mounted on one end of the inelastic portion 10a is the housing or base 16a of a potentiometer 16. The potentiometer toroidal winding 16b is stationarily mounted within this housing, and the cooperable wiper 16c is mounted on a rotary support 16d to rotate with it about the axis of toroidal winding 16b. The wiper is grounded by a resilient brush 16e which slides in contact with a grounded center post 16f. The rotary support 16d is carried by a shaft 16g and in turn has a rim portion 16h grooved peripherally as a sheave. A spiral spring 16i connected between the central disk 16j and the sheave 16h returns the wiper assembly to an initial position, against a stop (not shown).

A flexible inelastic link comprising a length of small chain 16k enwraps the sheave 16h and extends therefrom outwardly from housing 16a through a guide opening 16m to a take-up adjustment rod 20 which is held clamped in a connector 22 fixed to the opposite end of the inelastic portion 10a. The rod has a plurality of transverse notches 20a spaced at intervals along its length. A boss or peg 24a carried by a releasable clamp element 24 is engageable with any of the notches brought into registry with it by sliding the rod 20 lengthwise of itself through the connector 22 with the clamp 24 loosened. In this manner chain tension may be established at the desired initial value with the chest either expanded or contracted. Preferably this setting is made so that the limits of potentiometer movement are never quite reached on either maximum expansion or contraction of the chest. Thus the full excursion of the chest is detected and converted into a maximum output signal linearly related to rotary movement of the potentiometer wiper which is in turn linearly related to chest girth changes, largely unaffected by twisting or other changes of posture of the patient during a respiration test period.

The potentiometer winding terminals are connected across a suitable voltage source 30 and in circuit with a suitable recorder 32 or other indicator, the details of which and of the connections thereto are or may be conventional. The potentiometer functions as a ratio device or voltage divider and is therefore insensitive to changes of resistance of winding 16a and remains linear and accurate in its response at all times.

These and other aspects of the invention will be recognized by those skilled in the art based on the illustrative disclosure herein presented.

I claim as my invention:

1. A respirometer device comprising a chest encircling band including a relatively long inelastic portion having separated ends interconnected by a relatively short elastic portion adapted to stretch and contract elastically as the patient breathes, a potentiometer having a base mounted on one of said ends and having cooperating electrical resistance and wiper elements mounted on the base, one such element for rotation relative to the other, actuating means including an inelastic link connecting the rotary element with the other of said ends to effect rotation of the element proportional to change of length of said elastic portion, and electric circuit means connected to the resistance element and to the wiper for detecting such rotation, and thereby chest contraction and expansion.

2. A respirometer device comprising a chest encircling band including a relatively long inelastic portion having separated ends interconnected by a relatively short elastic portion adapted to stretch and contract elastically as the patient breathes, a potentiometer having a base mounted on one of said ends and having cooperating electrical resistance and wiper elements mounted on the base, one such element for rotation relative to the other, actuating means including an inelastic link connecting the rotary element with the other of said ends to effect rotation of the element proportional to change of length of said elastic portion, and electric circuit means connected to the resistance element terminals and to the wiper for measuring the change in ratio of the complemental portions of the resistance element defined by the position of the wiper thereon, thereby to measure chest contraction and expansion independently of variations in the total resistance of the resistance element caused, for example, by temperature change.

3. The respirometer device defined in claim 2, wherein the actuating means comprises a spring-returned mechanism including a sheave-like element mounted to rotate conjointly with the rotary element and including a return spring against the force of which the sheave-like member is rotated during chest expansion, and the inelastic link comprises an elongated cord-like member enwrapping said sheave-like element and fastened to said other of said ends of the inelastic chest band portion.

4. A respirometer device comprising a chest encircling band including a relatively long inelastic portion having separated ends interconnected by a relatively short elastic portion adapted to stretch and contract elastically as the patient breathes, a potentiometer having a base mounted on one of said ends and having cooperating stationary electrical resistance and rotary wiper elements mounted on the base, actuating means including a sheave rotational with the wiper, a cord-like member enwrapping the sheave and fastened under tension to the other of said ends to effect rotation of the wiper element proportional to change of length of said elastic portion, and a return spring acting on the sheave to return the same toward an initial position when tension is relaxed in the cord-like member, and electric circuit means connected to the resistance element and to the wiper for detecting such rotation, and thereby chest contraction and expansion.

5. A respirometer device comprising a chest encircling band including a relatively long inelastic portion having separated ends, a potentiometer having a base mounted on one of said ends and having cooperating stationary electrical resistance and rotary wiper elements mounted on the base, actuating means including a sheave rotational with the wiper, a cord-like member enwrapping the sheave and fastened under tension to the other of said ends to effect rotation of the wiper element proportional to change of the spacing between the ends of the inelastic portion, and a return spring acting on the sheave to return the same toward an initial position when tension is relaxed in the cord-like member, and electric circuit means connected to the resistance element and to the wiper for detecting such rotation, and thereby chest contraction and expansion.

6. A respirometer device comprising a chest encircling band including a relatively long inelastic portion having separated ends, a potentiometer having a base mounted on one of said ends and having cooperating stationary electrical resistance and rotary wiper elements mounted on the base, actuating means including a sheave rotational with the wiper, a cord-like member enwrapping the sheave and fastened under tension to the other of said ends to effect rotation of the wiper element proportional to change of the spacing between the ends of the inelastic portion, and a return spring acting on the sheave to return the same toward an initial position when tension is relaxed in the cord-like member, and electric circuit means connected to the resistance element terminals and to the wiper for measuring the change in ratio of the complemental portions of the resistance element defined by the position of the wiper thereon, thereby to measure chest contraction and expansion independently of variations in the total resistance of the resistance element caused, for example, by temperature change.

7. A respirometer device comprising a chest encircling band including a relatively long inelastic portion having separated ends interconnected by a relatively short elastic portion adapted to stretch and contract elastically as the patient breathes, a potentiometer having a base mounted on one of said ends and having cooperating electrical resistance and wiper elements mounted on the base, one such element for movement relative to the other, actuating means including an inelastic link connecting the movable element with the other of said ends to effect movement of the element proportional to change of length of said elastic portion, and electric circuit means connected to the resistance element terminals and to the wiper for detecting such relative movement and thereby chest expansion and contraction.

References Cited in the file of this patent

UNITED STATES PATENTS 2,428,980    McCann _____ Oct. 14, 1947

FOREIGN PATENTS 492,463    Italy _____ Mar. 26, 1954